United States Patent [19]

Nakamura et al.

[11] Patent Number: 4,641,202
[45] Date of Patent: Feb. 3, 1987

[54] SKIP FIELD COLOR RECORDING APPARATUS

[75] Inventors: Yoshiyuki Nakamura, Tokyo; Tetsuro Kato; Norio Ebihara, both of Kanagawa, Japan

[73] Assignee: Sony Corporation, Tokyo, Japan

[21] Appl. No.: 646,743

[22] Filed: Sep. 4, 1984

[30] Foreign Application Priority Data

Sep. 8, 1983 [JP] Japan .................................. 58-163889

[51] Int. Cl.⁴ ............................................ H04N 9/491
[52] U.S. Cl. ..................................... 358/313; 360/11.1
[58] Field of Search ................ 358/310, 313; 360/11.1

[56] References Cited

U.S. PATENT DOCUMENTS 4,251,830  2/1981  Tatami ................................. 358/320

FOREIGN PATENT DOCUMENTS 57-72557  5/1982  Japan .

Primary Examiner—Robert L. Richardson
Attorney, Agent, or Firm—Lewis H. Eslinger; Alvin Sinderbrand

[57] ABSTRACT

A video signal reproducing apparatus having a driving mechanism for driving a magnetic tape on which a video signal is recorded as succeeding video tracks and a transducing head device for reproducing the video signal from the succeeding video tracks mounted on a cylindrical drum around which the magnetic tape is wrapped, the transducing head device having a bimorph plate and a transducing head mounted thereon is disclosed. The apparatus includes a field memory for memorizing one field and two field previous video signals of the reproduced video signal, a comparator for comparing a field identification signal of a reference signal with that of the reproduced video signal, a selector for selectively deriving one of the one field and two field previous video signals in response to an output signal of the comparator, and adding circuit for adding at least two succeeding horizontal line signals of the reproduced video signal and for generating an averaging video signal, a detector for detecting the movement of the reproduced video signal in response to the reproduced video signal and the output signal of the memory, a weighting circuit for generating a weighting signal corresponding to the output signal of the detector, a circuit for weighting the output signals of the adding circuit and the driving circuit in response to the weighting signal and a circuit for combining the weighted output with the averaging video signal.

4 Claims, 16 Drawing Figures

FIG. 4A
REF $\begin{array}{cccccccccccccccccccccccccccccccccccccccc} 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 & 27 & 28 & 29 & 30 & 31 & 32 & 33 & 34 & 35 & 36 & 37 & 38 & 39 \\ O & E & O & E & O & E & O & E & O & E & O & E & O & E & O & E & O & E & O & E & O & E & O & E & O & E & O & E & O & E & O & E & O & E & O & E & O & E & O \end{array}$ FIG. 4B
$V_{IN}$  $O E_1 O_2 E_2 O_3 E_3 E_4 O_5 E_5 O_6 E_6 O_7 O_8 E_8 O_9 E_9 O_{10} E_{10} E_{11} O_{12} E_{12} O_{13} E_{13} O_{14} O_{15} E_{15} O_{16} E_{16} O_{17} E_{17} E_{18} O_{19} E_{19} O_{20} E_{20} O_{21} O_{22} E_{22} O_{23}$ FIG. 4C
S1  $X O_1 E_1 O_2 E_2 O_3 E_3 E_4 O_5 E_5 O_6 E_6 O_7 O_8 E_8 O_9 E_9 O_{10} E_{10} E_{11} O_{12} E_{12} O_{13} E_{13} O_{14} O_{15} E_{15} O_{16} E_{16} O_{17} E_{17} E_{18} O_{19} E_{19} O_{20} E_{20} O_{21} O_{22} E_{22}$ FIG. 4D
S2  $X X O_1 E_1 O_2 E_2 O_3 E_3 E_4 O_5 E_5 O_6 E_6 O_7 O_8 E_8 O_9 E_9 O_{10} E_{10} E_{11} O_{12} E_{12} O_{13} E_{13} O_{14} O_{15} E_{15} O_{16} E_{16} O_{17} E_{17} E_{18} O_{19} E_{19} O_{20} E_{20} O_{21} O_{22}$ FIG. 4E
S2  X XS2 - - - S2S1 - - - - S2S1 - - - - S2S1 - - - S1 S2
S4  X X $O_1 E_1 O_2 E_2 O_3$ - - $E_5 O_5 O_6 E_6 O_7$ - - $E_9 O_9 O_{10} E_{10}O_{12} E_{12} O_{13} E_{13} O_{14}$ - $O_{15} E_{15} O_{16} E_{16} O_{17}$ - - $E_{17} O_{19} E_{19} O_{20} E_{20} O_{21} O_{22}$ FIG. 4F
MDC  x x K - - - - - K K K K - - - - K K K K - - - K K K
(K)   ≠0      ≠0=0=0≠0       ≠0=0=0≠0       ≠0=0=0≠0     ≠0 =0 =0

FIG. 5A

REF 1 2 3 4 5 6 7 8 9 10 11 12 13 14 15 16 17 18 19 20 21 22 23 24 25 26 27 28 29 30 31 32 33 34 35 36 37 38 39
    O E O E O E O E O E O E O E O E O E O E O E O E O E O E O E O E O E O E O E O E O

MDC (K)  x x x K - - - K K K K - - - K K K K - - - K K K K - - - K K K K
         ≠0       =0=0≠0       ≠0=0=0≠0       ≠0=0=0≠0       ≠0=0=0≠0

SKIP FIELD COLOR RECORDING APPARATUS

BACKGROUND OF THE INVENTION

1. Field of the Invention

The present invention generally relates to video signal reproducing apparatus and more particularly to a video signal reproducing apparatus for use with a VTR (video tape recorder).

2. Description of the Prior Art

When a magnetic tape on which a television program having a predetermined duration of time is recorded is played back by, for example, a VTR for broadcast station, in order to insert other information than the television program, for example, a commercial into the magnetic tape within the predetermined duration of time, such a method is proposed in which the video signal constituting the television program is skipped at every predetermined interval, for example, at every field. In order to skip the video information of, for example, one field, a so-called dynamic tracking system has been used so far in which the tape running speed relative to a rotary magnetic head is increased by, for example, about 1% relative to the tape running speed of the playback mode to thereby gradually displace the tracking position of a record track recorded obliquely on the magnetic tape by one field amount and when the tracking position is displaced by nearly one track, the rotary magnetic head jumps the succeeding track and reproduces the track adjacent to the skipped track.

By the way, in this case, when the rotary magnetic head jumps one track and moves to the track adjacent to the skipped track, a picture image signal of one field recorded on the track which is jumped by the rotary magnetic head is skipped from the reproduced video signal and lost. However, since the video signal thus reproduced is usually processed at the unit of the picture image signal of one frame formed of odd and even fields, the reproduced video signal having part of picture image information skipped has to undergo such signal processing that odd and even fields and a polarity of a chroma signal comply with a format of a standard television system.

As such prior art signal processing system, it is proposed that a picture image signal correcting circuit such as a line adding system is used to form a correcting picture image signal on the basis of picture image signals contained in adjacent two lines to thereby provide a picture image signal in which when a picture image information of one field is skipped, this skipped picture image information is interpolated.

However, according to this method, when the corrected picture image signal is matched in position so as to become continuous, there arises a problem that resolution of the resultant picture image is deteriorated. Further, in order to prevent the resolution of the picture image from being deteriorated, when the picture image signal is matched in position so as to maintain the resolution of the corrected picture image signal, there arises in turn a problem that the resultant picture image is moved in the up and down direction. In addition, as a second method for correcting the picture image, it is proposed that, of the reproduced video signal, a picture image signal as skipped field portion is jumped at frame unit such that odd and even fields of the reproduced video signal become coincident with those of a predetermined reference signal or that the skipped portion of the picture image signal is compensated for by repeatedly inserting the same data even-numbered times thereinto. However, this second method has a defect that the reproduced video signal, which is made discontinuous by the skipping of the picture image signal of one field, has further enlaged its discontinuous portion.

OBJECTS AND SUMMARY OF THE INVENTION

Accordingly, it is an object of the present invention to provide an improved video signal reproducing apparatus which can overcome the shortcomings inherent in the prior art video signal reproducing apparatus.

It is another object of the present invention to provide a video signal reproducing apparatus capable of producing a corrected video signal by which the deterioration of resolution of the corrected picture image signal, the up and down movement of the picture image and the discontinuity of the picture image can be suppressed as much as possible.

According to one aspect of the present invention, there is provided a video signal reproducing apparatus having a driving mechanism for driving a magnetic tape on which a video signal is recorded as succeeding video tracks and a transducing head means for reproducing said video signal from said succeeding video tracks mounted on a cylindrical drum on which said magnetic tape is wrapped, said transducing head means having a bimorph plate and a transducing head mounted thereon, comprising:

means for memorizing one field and two field previous video signals of said reproduced video signal;

means for comparing field identification signal of a reference signal with that of said reproduced video signal;

means for selectively deriving one of said one field and two field previous video signals in response to an output signal of said comparing means;

means for adding at least two succeeding horizontal line signals of said reproduced video signal and for generating an averaging video signal;

means for detecting a movement of said reproduced video signal in response to said reproduced video signal and an output signal of said memorizing means;

means for generating a weighting signal corresponding to an output signal of said detecting means;

means for weighting output signals of said adding means and said deriving means in response to said weighting signal; and means for combining said weighted output signal with said averaging video signal.

The other objects, features and advantages of the present invention will become apparent from the following description taken in conjunction with the accompanying drawings through which the like references designate the same elements and parts.

BRIEF DESCRIPTION OF THE DRAWINGS

FIGS. 4A to 4F and FIGS. 5A to 5F are respectively diagrams useful for explaining the operation of the video signal reproducing apparatus shown in FIG. 1.

DESCRIPTION OF THE PREFERRED EMBODIMENTS

Figure 1:
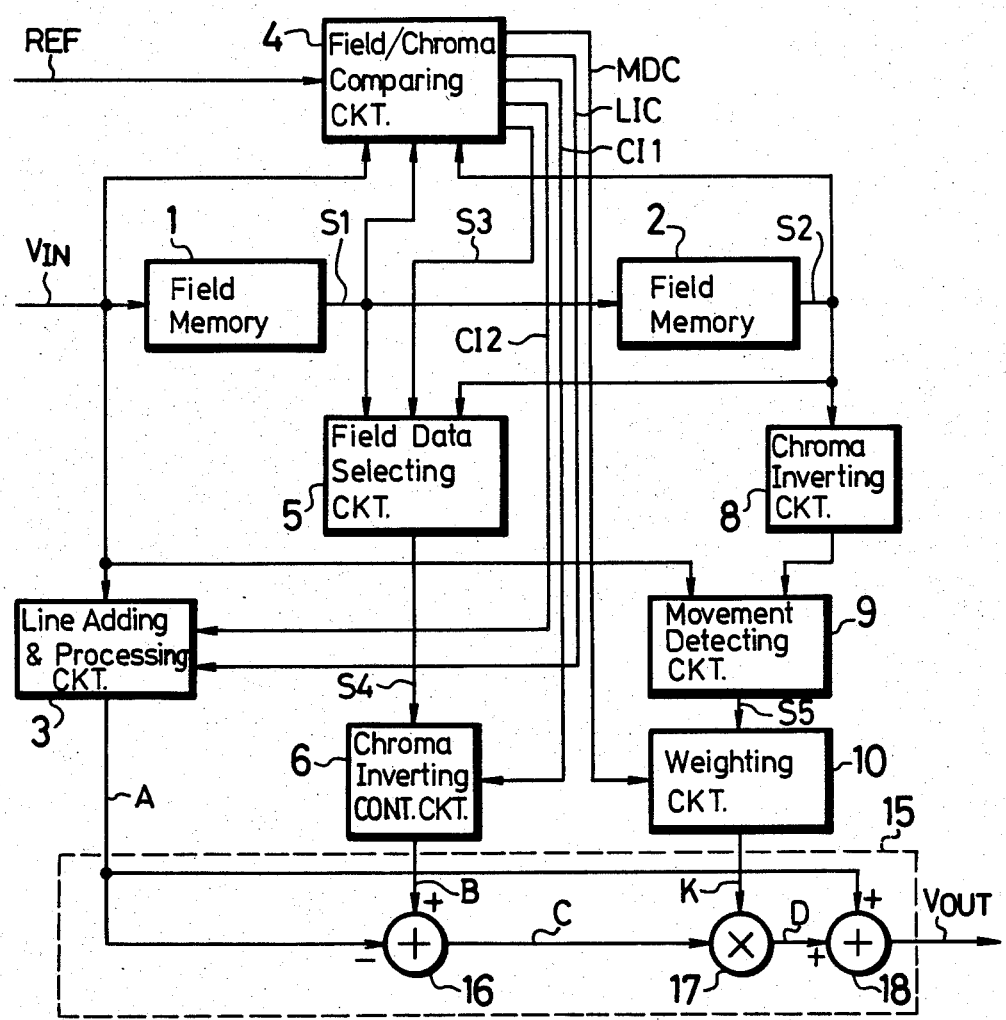
FIG. 1 is a block diagram showing an embodiment of a video signal reproducing apparatus according to the present invention.

Now, the present invention will hereinafter be described with reference to the drawings. FIG. 1 shows an embodiment of a video signal reproducing apparatus according to the present invention.

In FIG. 1, reference numerals 1 and 2 respectively designate first and second field memories which constitute a video memory. A video signal of one field amount in a reproduced video signal $V_{IN}$ is played back from a magnetic tape by a VTR which, though not shown, comprises a driving mechanism for driving the magnetic tape on which the video signal is recorded as succeeding video tracks and a transducing head for reproducing the video signal from the succeeding video tracks, the transducing head being mounted on a cylindrical drum on which the magnetic tape is wrapped, the transducing head including a bimorph plate and a transducing head mounted thereon. Then, the reproduced video signal is written in the first field memory 1 and then stored therein. The video signal stored therein is sequentially read out from the first field memory 1 at timing delayed just one field relative to the reproduced video signal $V_{IN}$. As a result, a one field previous video signal S1 is then written in the second field memory 2 and then stored therein. The data stored in the second field memory 2 is sequentially read out therefrom at timing delayed further one field relative to the one field previous video signal S1, thus a two field (accordingly, one frame) previous video signal S2 relative to the input video signal $V_{IN}$ being produced.

The reproduced video signal $V_{IN}$ contains, in addition to a luminance signal and a chrominance signal, information representing whether the field number is even or odd and information representing whether a polarity of a chroma signal is positive or negative. Accordingly, the one field previous video signal S1 and the two field previous video signal S2 each contain the field identification signal and the chroma information.

The reproduced video signal $V_{IN}$ is also supplied to a line adding and processing circuit 3. The line adding and processing circuit 3 eliminates the chroma signal by adding the reproduced video signal $V_{IN}$ and a video signal which results from delaying the reproduced video signal $V_{IN}$ by one horizontal period (1H). Also, the line adding and processing circuit 3 adds luminance signal data contained in two adjacent scanning lines and produces a mean value between the luminance signals contained in the two adjacent scanning lines as a new luminance signal. Further in the line adding and processing circuit 3, either the reproduced video signal $V_{IN}$ or the signal which results from delaying the reproduced video signal $V_{IN}$ by 1H is inverted in polarity and then both of them are added so as to produce a chroma signal, the polarity of this chroma signal is inverted to be coincident with the polarity of the chroma signal contained in a reference signal REF, which is added to the new luminance signal to form a new video signal, and the new video signal is controlled such that whether or not the new video signal is delayed 1H by a line adding control signal LIC derived from a field/chroma comparing circuit 4, to which a reference signal REF is applied, to thereby match the position of the new video signal. Thus, from the line adding and processing circuit 3, is produced a line added video signal A having the mean value between the luminance signals contained in the adjacent two scanning lines and the same polarity as that of the chroma signal contained in the reference signal REF.

The one field previous video signal S1 and the two field previous video signal S2 are respectively supplied to a field data selecting circuit 5. The field data selecting circuit 5 selects either of the video signals S1 and S2 on the basis of a selecting control signal S3 applied thereto from the field/chroma comparing circuit 4 and supplies a selected video S4 to a chroma inverting control circuit 6. In this embodiment, the field data selecting circuit 5 is normally in the mode to select the one field previous video signal S1, while when the odd number and the even number of the field number of the video signal S1 become different from those of the reference signal REF, the field data selecting circuit 5 is changed in mode to select the two field previous video signal S2 to thereby match the odd number and the even number of the field number with those of the reference signal REF. Further, when the polarity of the chroma signal which is contained in the video signal S4 derived from the field data selecting circuit 5 becomes different from that of the reference signal REF, the chroma inverting control circuit 6 inverts the polarity of the chroma signal of the video signal S4 on the basis of a chroma inverting control signal CI1 applied thereto from the field/chroma comparing circuit 4. Accordingly, the chroma inverting control circuit 6 can produce a standardized video signal B in which the odd number and the even number thereof and the polarity thereof are coincident with those of the reference signal REF.

The two field previous video signal S2 is supplied to a chroma inverting circuit 8 which inverts the polarity of the chroma signal contained in the video signal S2 and then supplied to a movement detecting circuit 9 as a first comparing input thereof and also the reproduced video signal $V_{IN}$ is supplied to the movement detecting circuit 9 as a second comparing input thereof. The movement detecting circuit 9 compares the content of each scanning line of the reproduced video signal $V_{IN}$ with the content of the corresponding scanning line of the two field previous video signal S2 and produces and supplies a movement detected signal S5 in correspondence with the difference therebetween to a weighting circuit 10.

Figure 2:
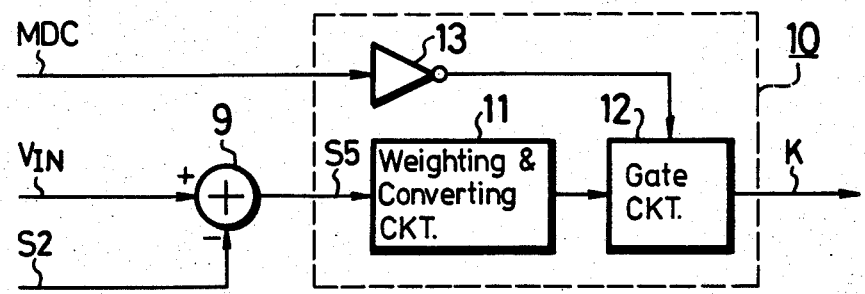
FIG. 2 is a block diagram showing a detailed circuit arrangement of a weighting circuit used in the present invention.
Figure 3:
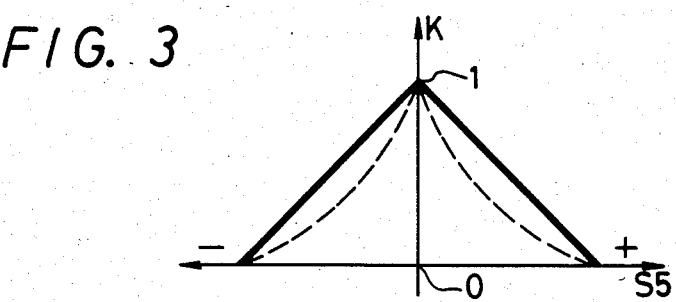
FIG. 3 is a graph indicating data stored in a weighting conversion circuit used in the weighting circuit shown in FIG. 2.

The weighting circuit 10 as shown in FIG. 2 includes a weighting and converting circuit 11 which receives a movement detected signal S5. This weighting and converting circuit 11 produces a weighting coefficient K which, as shown in FIG. 3, becomes 1 when the absolute value of the movement detected signal S5 is 0 (namely, when the reproduced video signal $V_{IN}$ has the same content as that of the one frame previous video signal S2), while when the absolute value of the movement detected signal S5 is increased from 0, the value of the weighting coefficient K gradually becomes small. In practice, the weighting and converting circuit 11 is formed of a programmable read-only memory (PROM) which stores therein the curve in FIG. 3 as a look-up table. From this weighting and converting circuit 11 read-out is a weighting coefficient K by using the movement detected signal S5 as the read signal thereof, the magnitude of the weighting coefficient K thus read-out corresponding to the value of the movement detected signal S5.

As shown in FIG. 2, the weighting coefficient K read-out from this weighting and converting circuit 11 is delivered through a gate circuit 12 as the output of the weighting circuit 10. The gate circuit 12 is supplied with a movement detecting control signal MDC from the field/chroma comparing circuit 4 through an inverter 13 as a closing control signal. When the content of the reproduced video signal $V_{IN}$ has no correlation at all with the content of the two field previous video signal S2, the movement detecting control signal MDC contorls the gate circuit 12 to be closed through the inverter 13. At that time, the output or weighting coefficient K of the weighting circuit 10 thus becomes zero.

The field/chroma comparing circuit 4 produces the respective control signals to the line adding and processing circuit 3, the field data selecting circuit 5, the chroma inverting control circuit 6 and the weighting circuit 10 as described above. The field/chroma comaring circuit 4 receives the reference signal REF, the reproduced video signal $V_{IN}$, the one field previous video signal S1 and the two field previous video signal S2 to judge whether or not the field identification signal (signal indicating whether the field number is the odd number or the even number) of the reference signal REF is coincident with that of each signal and to compare the polarity of the chroma signal of each scanning line of the reference signal REF with the polarities of the chroma signals contained in the video signals $V_{IN}$, S1 and S2.

First, the field/chroma comparing circuit 4 compares the field identification signal of the reference signal REF with the field identification signal of the two field previous video signal S2 and supplied the selection control signal S3 to the field data selecting circuit 5. When the reference signal REF is not coincident with the video signal S2, the field data selecting circuit 5 selects the one field previous video signal S1 and supplies the same to the chroma inverting control circuit 6 as the selected output S4. While, when the reference signal REF is coincident with the video signal S2, the field data selecting circuit 5 selects the two field previous video signal S2 and supplies the same to the chroma inverting control circuit 6 as the selected output S4. Thus, the video signal having the odd and even information which is coincident with the odd and even information contained in the reference signal REF is usually selected and then supplied to the chroma inverting control circuit 6.

Secondly, the field/chroma comparing circuit 4 receives the reproduced video signal $V_{IN}$ and supplies the line adding control signal LIC to the line adding and processing circuit 3 on the basis of the field identification signal contained in the reproduced video signal $V_{IN}$. In this embodiment, the line adding control signal LIC controls the line adding and processing circuit 3 such that the position of the line adding video signal A, which is derived from the line adding and processing circuit 3, is changed to 1H before or after in accordance with the odd or even field information of the reproduced video signal $V_{IN}$, thus the position of the picture image of the video signal resulting from the line-adding operation being matched.

Thirdly, the field/chroma comparing circuit 4 compares the chroma information (that is, the polarity of the chroma signal) of the reference signal REF with those of the one field previous video signal S1 and the two field previous video signal S2 and supplies to the chroma inverting control circuit 6 the chroma inverting control signal CI1 which causes the chroma inverting control circuit 6 to carry out its inverting operation when the chroma information of the video signal S1 or S2 selected by the field data selecting circuit 5 is not coincident with the chroma information of the reference signal REF.

Fourthly, the field/chroma comparing circuit 4 supplies a chroma inverting control signal CI2 to the line adding and processing circuit 3 on the basis of the field identification signal of the reproduced video signal $V_{IN}$ and the chroma informations of the reference signal REF and the reproduced video signal $V_{IN}$ such that when this circuit 3 selects data of 1H before or 1H after on the basis of the field identification signal of the reproduced video signal $V_{IN}$, the polarity of the chroma signal contained in the video signal A which results from the line-adding operation including the results of the selection is made coincident with the polarity of the chroma signal contained in the reference signal REF.

Fifthly, the field/chroma comparing circuit 4 compares the field identification signal of the reference signal REF with those of the one field previous video signal S1 and the two field previous video signal S2 and when the contents of the video signals S1 and S2 have no correlation with the content of the reference signal REF, the field/chroma comparing circuit 4 sends to the weighting circuit 10 the movement detecting control signal MDC which closes the gate circuit 12 (see FIG. 2) of the weighting circuit 10.

As mentioned above, the line adding and precessing circuit 3, the chroma inverting control circuit 6 and the weighting circuit 10 respectively produce output signals A, B and K which have the field and chroma informations coincident with those of the reference signal REF. These output signals A, B and K are respectively supplied to an output video signal generating circuit 15. The output video signal generating circuit 15 includes an adding circuit 16 which, on the basis of the standardized video signal B and the line added video signal A, performs the following calculation:

$$C=B-A \quad \ldots (1)$$

Its output C is supplied to a multiplying circuit 17 in which it is multiplied with the weighting coefficient K to produce a multiplied output D expressed as:

$$D=C \cdot K \quad \ldots (2)$$

The multiplied output D is added with the line added video signal A by an adding circuit 18 so as to produce an added output $V_{OUT}$ expressed as:

$$V_{OUT}=D+A \quad \ldots (3)$$

Substituting the above equations (2) and (1) into the equation (3) yields:

$$V_{OUT}=C \cdot L+A=(B-A) \cdot K+A=(1-K) \cdot A+K \cdot B \quad \ldots (4)$$

Accordingly, the video signal reproducing apparatus shown in FIG. 1 produces the output signal which can be expressed as the sum of the signal component, which results from multiplying the line added video signal A with a weighting coefficient $(1-K)$ as shown by the first factor in the equation (4) and the signal component, which results from multiplying the standardized video signal B with the coefficient K as shown by the second factor in the equation (4). In this case, on the basis of the output S5 from the movement detecting circuit 9, the coefficient K is determined by a difference between the content of the reproduced video signal $V_{IN}$ and the content of the two field previous video signal S2. This difference represents the moving amount of the picture images which are formed by the reproduced video signals $V_{IN}$ sequentially delivered. In other words, the equation (4) means that when the picture image expressed by the coming reproduced video signal $V_{IN}$ is changed and the factor of the standardized video signal B becomes large in correspondence therewith, the factor of the line added video signal A is made small, while when the weighting coefficient K becomes small, the signal component of the standardized video signal B is made small and the signal component of the line added video signal A is made large in the equation (4).

The weighting circuit 10 is operated as described in connection with FIG. 3 so that when the detecting signal S5 is 0 (that is, in the case of a still picture having no motion), the weighitng coefficient K is made 1, while when the detecting signal S5 becomes gradually large from 0, the absolute value of the coefficient K is made small in correspondence therewith. Accordingly, in the case of the still picture haivng no movement, $(1-K) \rightarrow 0$ is established in the equation (4) so that the standardized video signal B is delivered as the output video signal $V_{OUT}$. On the other hand, in the case where the absolute value of the movement detecting signal S5 becomes large (this means that the coming reproduced video signal represents a moving picture, namely, an animation), if the movement becomes larger, the absolute value of the coefficient K becomes smaller. Thus in the above equation (4), the signal component of the video signal B becomes small, while the signal component of the line added video signal A becomes large. In addition, when the reproduced video signal $V_{IN}$ and the two field previous video signal S2 have no correlation with the reference signal REF, the gate circuit 12 is closed by the movement detecting signal MDC derived from the field/chroma comparing circuit 4 so that the coefficient K becomes 0. Thus, as will be clear from the equation (4), the output video signal $V_{IN}$ contains only the line added video signal A.

With the circuit arrangement thus made, as shown in FIG. 4A, if the field identification signals of the reference signal REF advance just like field numbers 1, 2, 3, . . . , the field identification signals of the reference signal REF arrive with the odd and even (simply shown as O and E) numbers being alternately inverted. For such field identification signal of the reference signal REF, let it be assumed that the field identification signals of the reproduced video signal $V_{IN}$ (see FIG. 4B) are such ones in which an odd field $O_4$, an even field $E_7$, an odd field $O_{11}$, an even field $E_{14}$, an odd field $O_{18}$, an even field $E_{21}$ . . . are sequentially skipped between 6th and 7th fields; 12th and 13th fields; 18th and 19th fields; 24th and 25th fields; 30th and 31st fields; 36th and 37th fields . . . of the reference signal REF. At that time, from the first and second field memories 1 and 2 respectively are produced the video signals S1 and S2 which are provided by sequentially delaying the reproduced video signal $V_{IN}$ by every one field as shown in FIGS. 4C and 4D. On the basis of the compared result of the video signals $V_{IN}$, S1 and S2 and in the field/chroma comparing circuit 4, the field data selecting circuit 5, the weighting circuit 10 and the line adding and processing circuit 3 are controlled so that the output video signal generating circuit 15 generates the output video signal $V_{OUT}$ based on the equation (4).

In other words, when the field identification signal of the reference signal REF and the field identification signal of the two field previous video signal S2 are made coincident with each other, the field data selecting circuit 5 selects the two field previous video signal S2 as shown in FIG. 4E, while when the above field identification signals are not coincident, the field data selecting circuit 5 selects the one field previous video signal S1. Thus, at timing in which the odd field of the reproduced video signal $V_{IN}$ is skipped, or between 6th and 7th fields; 18th and 19th fields; and 30th and 31st fields . . . of the reference signal REF, the field identification signal of the selecting output S4 can produce field data in which odd and even informations alternately appear so that the continuity of the video signal can be maintained.

While, at timing in which an even field of the reproduced video signal $V_{IN}$ is skipped, or between 12th and 13th fields; 24th and 25th fields; and 36th and 37th fields . . . of the reference signal REF, the field identification signals of the selecting output signal S4 become discountinuous.

As described above, during a period in which the field identification signal of the selected output signal S4 is continuous, as shown in FIG. 4F, the movement detecting control signal MDC for the weighting circuit 10 does not obstruct the weighting circuit 10 from producing the weighting coefficient signal K so that since in the equation (4) the weighting coefficient becomes a value other than K or 0, in accordance with the value of K, namely, the difference (that is, the movement of the picture image) between the reproduced video signal $V_{IN}$ and the two field previous video signal S2, the output video signal generating circuit 15 generates the output video signal $V_{OUT}$ having large signal component of the standardized video signal B if the animation has large K and the output video signal $V_{OUT}$ having large line added video signal component if the animation has small K.

While, in the field portion in which the field identification signal of the selected output signal S4 becomes discontinuous, if the reference signal REF and the one frame previous video signal S2 are not coincident and the field identification signal of the reference signal REF is coincident with that of the reproduced video signal $V_{IN}$, the movement detecting control signal MDC of the field/chroma comparing circuit 4 causes the gate circuit 12 (see FIG. 2) in the weighting circuit 10 to be closed to thereby make the weighting coefficient K as 0. Accordingly, at that time, since the output video signal $V_{OUT}$ in which K=0 is established in the above equation (4) is delivered, the content of the output video signal $V_{OUT}$ becomes the line added video signal A which the line adding and processing circuit 3 produces.

Therefore, the content of the output video signal $V_{OUT}$ in the field interval in which the weighting coefficient K is 0 is compensated for by the line adding method.

As set forth above, with the circuit arrangement shown in FIG. 1, when a signal in which field identification signal is intermittently skipped is supplied to the circuit as the reproduced video signal $V_{IN}$, the continuity of the field identification signal can be maintained on the basis of the weighting coefficient K determined by the magnitude of the difference between the reproduced video signal $V_{IN}$ and the two field previous video signal S2. In addition, the change of the picture image can be made without losing the smoothness on the basis of the above equation (4) and hence it is possible to easily obtain the output video signal $V_{OUT}$ having no up and down movement and the time base of which is compressed without deteriorating the resolution. It is needless to say that the line added video signal A and the standardized video signal B are respectively controlled in the line adding and processing circuit 3 and the chroma inverting control circuit 6 so as to make the polarities of the chroma signals thereof coincident with the polarity of the reference signal REF and further the weighting coefficient signal K is so controlled in the chroma inverting circuit 8 that chroma signal is made coincident with the reference signal REF.

Figures 5A, 5B, 5C, 5D, 5E, 5F:
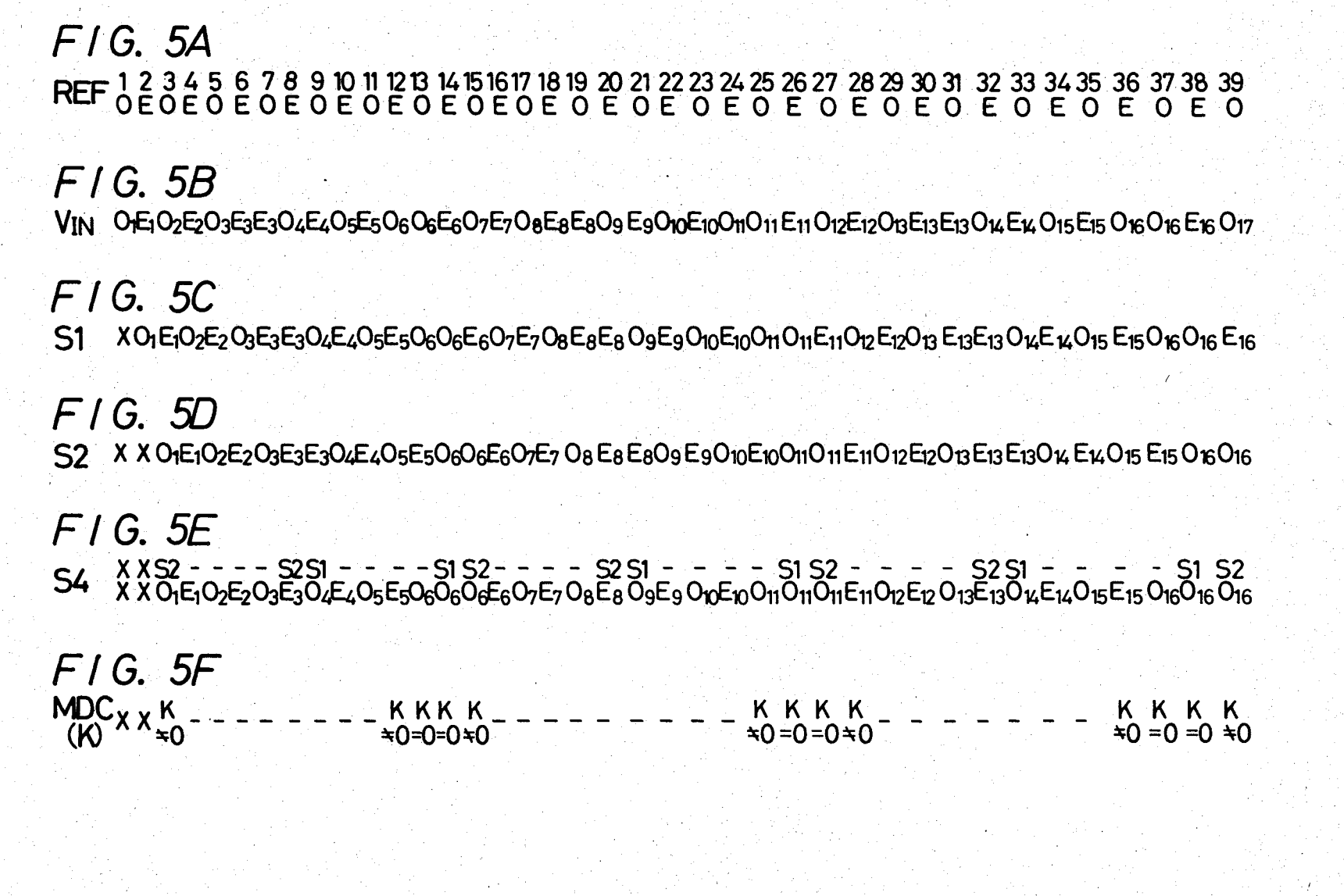

When, for example, an image is reviewed by rewinding a magnetic tape at tape speed of substantially one multiple speed, as shown in FIG. 5 which corresponds to FIG. 4, the reproduced video signal $V_{IN}$ is reproduced with its picture image signal of a certain field being overlapped. More particularly, as shown in FIG. 5B, between 6th and 7th fields; 12th and 13th fields; 18th and 19th fields; 24th and 25th fields; 30th and 31st fields; 36th and 37th fields ... of the reference signal REF (see FIG. 5A), an even field $E_3$ an odd field $0_6$, an even field $E_8$, an odd field $O_{11}$, an even field $E_{13}$, an odd field $O_{16}$ ... are overlapped and then reproduced.

When the content of the field identification signal of the two field previous video signal S2 (see Fig. 5D) is coincident with the field identification signal of the reference signal REF, the field data selecting circuit 5 selects the data of the two field pervious video signal S2 and delivers the same as the selected output S4 (see FIG. 5E), while when the content of the field identification signal of the video signal S2 is not coincident with the field identification signal of the reference signal REF, the field data selecting circuit 5 selects the one field previous video signal S1 (see FIG. 5C) and delivers the same as the selected output S4. In this case, at timing between 13th and 14th fields; 25th and 26th fields; and 37th and 38th fields of the reference signal REF, the field identification signal of the selected output signal S4 become discontinuous (see FIG. 5E). However, when the weighting coefficient signal K supplied from the weighting circuit 10 under the condition that at these timings the field identification signal of the reference signal REF and the field identification signal of the two field previous video signal S2 not be coincident with each other and that the field identification signal of the reference signal REF and the field identification signal of the reproduced video signal $V_{IN}$ be coincident with each other, is made 0 so as to change the content of the output video signal $V_{OUT}$ at the timing to the line added video signal A, the discontinuous portion of the field identification signal can be compensated for by the line adding method.

As described above, even if the reference signal REF and the reproduced video signal $V_{IN}$ as shown in FIGS. 5A and 5B are delivered, at the timing when the field identification signal and the polarity of the chroma signal are made coincident with those of the reference signal REF and the field identification signal is skipped or overlapped, the continuity can be maintained.

While in the above embodiment the weighting converting circuit 11 in the weighting circuit 10 produces the weighting coefficient K which changes linearly relative to the change of the movement detecting signal S5 as shown in FIG. 3, the above change or inclination of the weighting coefficient K is not limited to the straight line but may be a curve as shown by a broken line in FIG. 3.

Figure 6:
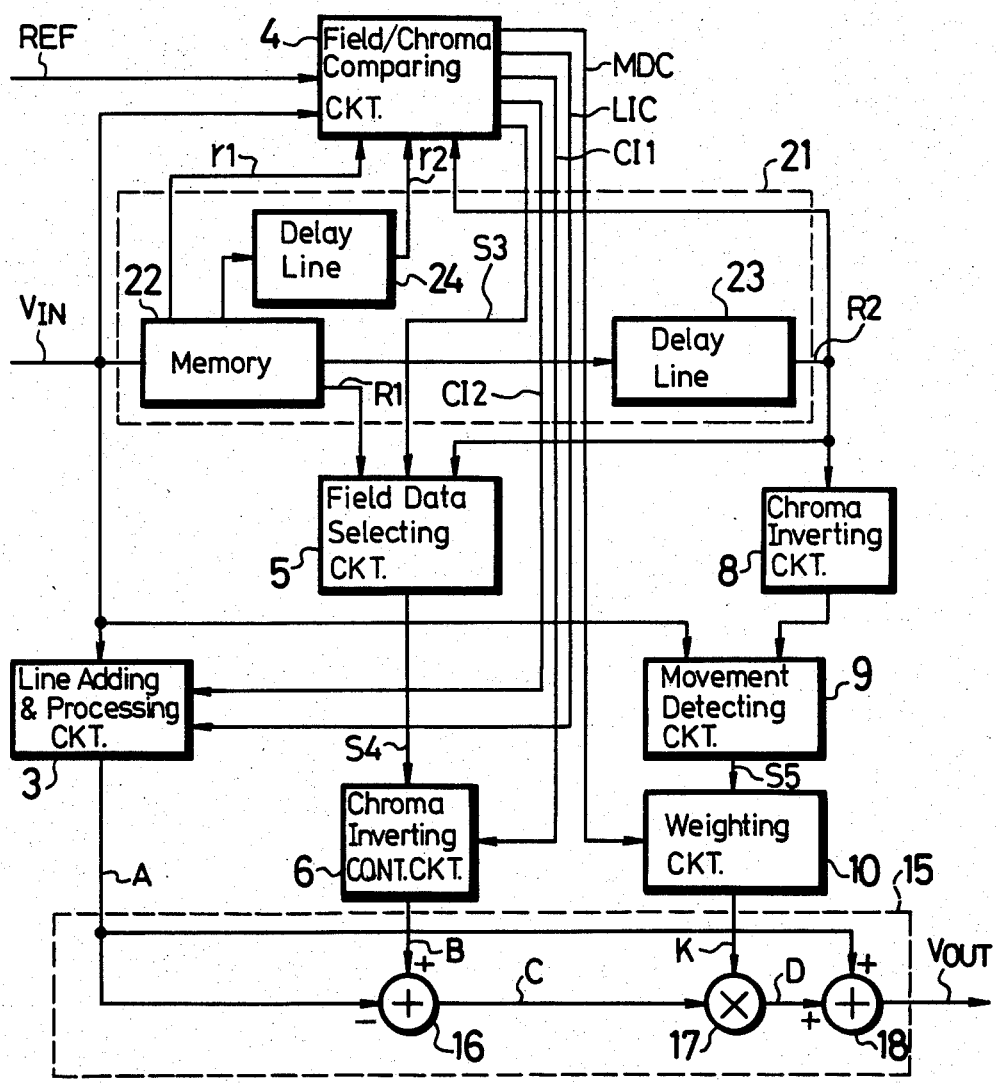
FIG. 6 is a block diagram showing another embodiment of the video signal reproducing apparatus according to the present invention.

FIG. 6 shows another embodiment of the video signal reproducing apparatus according to the present invention. In FIG. 6, like parts corresponding to those in FIG. 1 are marked with the same references and will not be described in detail. In this embodiment, instead of the first and second field memories 1 and 2, there is provided a frame memory 21 as the video memory. A memory proper 22 in this frame memory 21 has a memory capacity of storing input picture image data of 2 fields which supplies a one field previous video signal R1 to the field data selecting circuit 5 and an information signal r1 having the field identification signal of a one field previous video signal and the polarity of a chroma signal thereof to the field/chroma comparing circuit 4. Further, the memory proper 22 delivers a two field previous video signal R2 through a 2nH delay circuit 23 and an information signal r2 formed of the one field previous field identification signal and the chroma signal thereof through a 2nH delay circuit 24 to the field/chroma comparing circuit 4, wherein n is a positive integer and H is a horizontal period. In this embodiment, the reason why the two field previous video signal R2 and the information signal r2 are delivered through the delay line or circuits 23 and 24 is that when the reproduced video signal $V_{IN}$ of one frame is sequentially stored in the memory proper 22 of the frame memory 21, if data at the juncture between data is stored in the delay lines 23 and 24, the memory 22 of the frame memory 21 can be reset at a good timing.

Thus, according to this embodiment shown in FIG. 6, it is possible to achieve the same effect as mentioned above.

As set forth above, according to the present invention, when the video signal recorded on the magnetic tape is compressed in timebase or then reproduced, at timing in which the field picture image signal is skipped and overlapped, it is possible to surely obtain the output video signal $V_{OUT}$ in which the field identification signal and the polarity of the chroma signal thereof are coincident with those of the reference signal and the reproduced video signal is compensated for so as to maintain the continuity of the picture image signal. Thus, it is possible to prevent the resolution of the output video signal $V_{OUT}$ from being deteriorated and to prevent the picture image from being moved in the up and down direction effectively.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. Apparatus for reproducing a video signal occurring in successive fields of successive horizontal line signals and having a field identification signal for each said field, said apparatus having a driving mechanism for driving a magnetic tape on which said video signal is recorded in successive video tracks, and transducing head means for reproducing said video signal from said successive video tracks and being mounted on a cylindrical drum about which said magnetic tape is wrapped, said transducing head means having a bimorph plate and a transducing head mounted thereon, said apparatus comprising:

memory means for storing a one field delayed video signal and a two field delayed video signal delayed from said reproduced video signal by one and two fields, respectively;

a source of a reference signal occurring in successive fields and including a reference field identification signal for each field;

comparing means for comparing said reference field identification signal of said reference signal with said field identification signal of said reproduced video signal and for producing a comparison output signal;

deriving means for selectively deriving one of said one field and two field delayed video signals in response to said comparison output signal of said comparing means and for producing the derived signal as a selected video signal;

adding means for adding at least two successive horizontal line signals of said reproduced video signal and for generating an averaged video signal therefrom;

detecting means for detecting a movement of an image corresponding to said reproduced video signal by comparing said reproduced video signal with an output video signal from said memory means and providing a respective detected output signal;

means for generating a weighting signal in response to said detected output signal of said detecting means;

weighting means for weighting said averaged video signal from said adding means and said selected video signal from said deriving means in response to said weighting signal to produce a weighted output signal; and means for combining said weighted output signal with said averaged video signal.

2. The apparatus according to claim 1, in which said reproduced video signal includes a chrominance signal and said reference signal includes a reference chrominance signal, said apparatus further comprising first inverting means connected between said memory means and said detecting means for inverting a chrominance signal of said two field delayed video signal, and second inverting means connected between said deriving means and said weighting means for inverting a chrominance signal of said selected video signal from said deriving means, said comparing means comparing said reference chrominance signal and said chrominance signal of said reproduced video signal and generating a second comparison output signal in accordance therewith, an inverting operation of said second inverting means being controlled in response to said second comparison output signal of said comparing means so that a field identification signal and a phase of a chrominance signal output from said second inverting means correspond to thos of said reference signal.

3. The apparatus according to claim 2, in which a value of said weighting signal is in inverse proportion to an absolute value of said detected output signal of said detecting means.

4. The apparatus according to claim 3, in which said weighting means includes subtraction means for subtracting said averaged video signal from said output signal of said second inverting means and multiplying means for multiplying an output signal of said subtraction means by said weighting signal.

* * * * *